Figure 2:
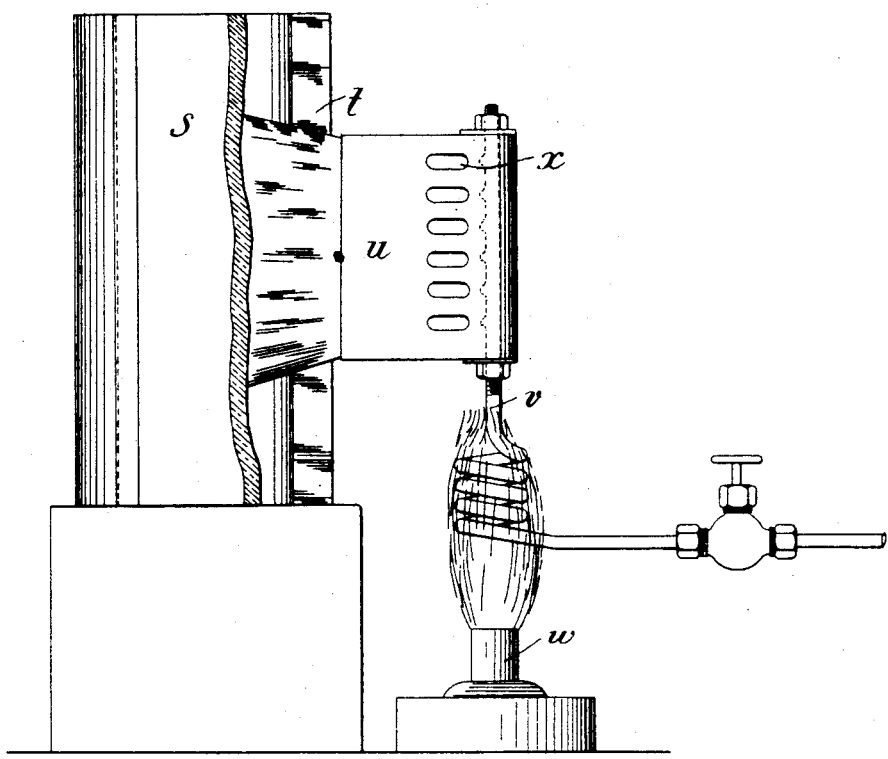

No. 867,763. PATENTED OCT. 8, 1907.
W. J. STILL.
MANUFACTURE OF TUBES.
APPLICATION FILED DEC. 27, 1905.
3 SHEETS—SHEET 1.
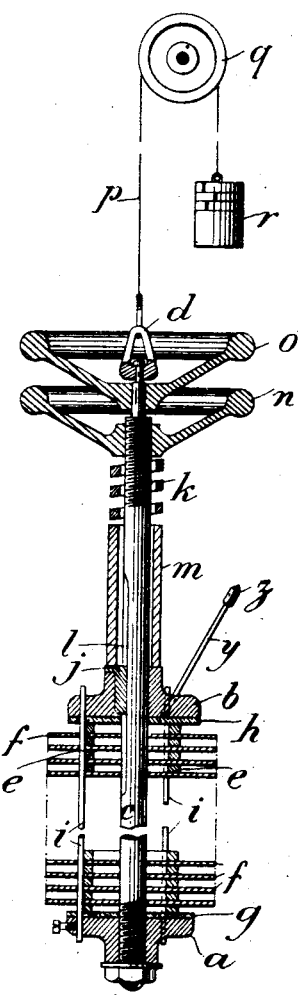
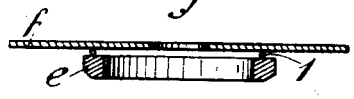

No. 867,763. PATENTED OCT. 8, 1907.
W. J. STILL.
MANUFACTURE OF TUBES.
APPLICATION FILED DEC. 27, 1905.

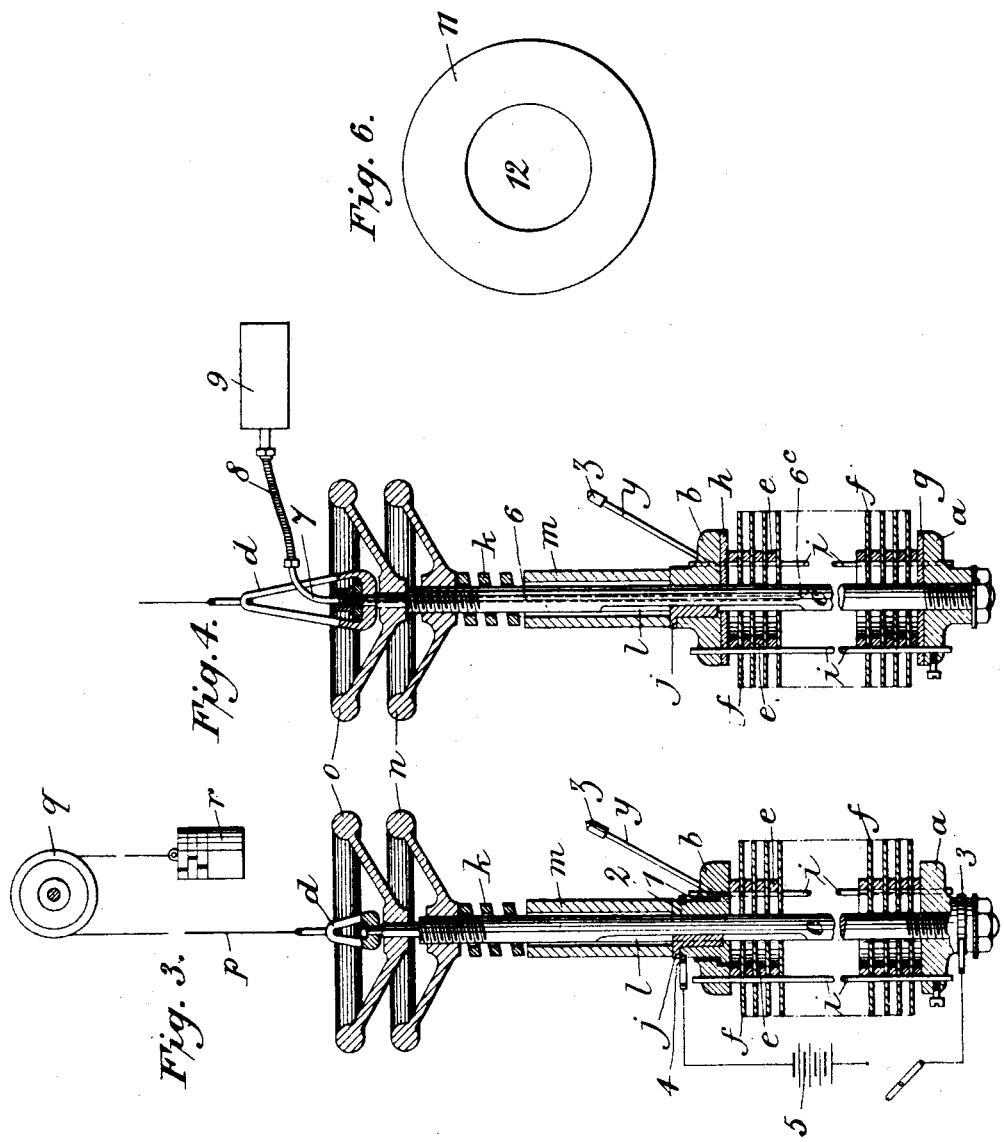

UNITED STATES PATENT OFFICE.

WILLIAM JOSEPH STILL, OF EALING, ENGLAND.

MANUFACTURE OF TUBES.

No. 867,763.   Specification of Letters Patent.   Patented Oct. 8, 1907.

Application filed December 27, 1905. Serial No. 293,506.

*To all whom it may concern:*

Be it known that I, WILLIAM JOSEPH STILL, a subject of the King of Great Britain and Ireland, residing at Ealing, in the county of Middlesex, England, have invented Improvements in and Relating to the Manufacture of Tubes, of which the following is a specification.

This invention relates to tubes built up of rings or of rings and perforated plates, and it has for object to improve the joints made between the several rings or between the several plates and rings. In the manufacture of such a tube according to this invention the several rings, or plates and rings, are placed together with interposed layers or coatings of a material which comprises both a metal or metallic alloy having a softening point lower than that or those of the surfaces or that of one of the surfaces that are to be united, and also a flux, and which, by being granular or pulverulent or otherwise, is adapted to keep the joints open until cleaned as stated below, and with the ends of the tube closed and its component parts pressed tightly together the whole is heated to a temperature at which the said material sets, whereupon the temperature is increased and maintained, with maintenance or preferably with increase of the pressure with which the parts are pressed together, until by the mere heating of the air within the tube or by the production of gases from the jointing material or from additional flux within the tube or by other means, gaseous pressure is generated within the tube which blows out at the joints the oxid or other foreign matter present and thereby produces clean surfaces to the jointing metal or alloy and at the same time spreads the metal or alloy completely over the surfaces to be united, the temperature being afterwards raised until proper jointing is effected.

For the purpose of carrying out the method above set forth I proceed as I will describe by way of example and with the aid of the accompanying illustrative drawings in reference to the manufacture of a tube composed of brass rings alternating with perforated copper plates; of the said drawings Figures 1 and 2 are vertical sections of apparatus employed, Figs. 3 and 4 are vertical sections representing modifications, and Fig. 5 is a sectional view of a ring and a plate in process of being joined together, and Fig. 6 is a plan of a cover for the furnace shown in Fig. 2. For this purpose I employ an alloy composed advantageously of 35 (thirty five) parts by weight of zinc, 30 (thirty) parts by weight of the metal of the rings, and 35 (thirty five) parts by weight of tin, and this alloy I reduce to a fine powder. I then take 1 (one) part by weight of phosphate of soda and 2 (two) parts by weight of boracic acid and of this mixture and the powdered alloy I take equal parts by volume and with the addition of water form thereof a paste.

After coating with the paste those edges of the rings that are to be adjacent to the plates the several rings and plates are now placed together and arranged as a stack between two disks or flanges $a$ and $b$ (Fig. 1) (hereinafter called disks) on a vertical bar $c$ which is suspended by a swivel $d$. Between the disks $a$ and $b$ and the stack of rings $e$ and plates $f$ there are inserted asbestos washers $g$ and $h$ and if required removable guide rods $i$ are arranged to extend from one of the disks, namely $a$, through holes in the other disk and in the plates $f$ for the purpose of holding the plates in their proper position relative to the rings, which fit between the rods. The lower disk $a$ is fixed to the bar $c$, while the upper one $b$ is adapted to slide thereon but is prevented from being rotated in relation thereto, as by a removable key $j$ engaging in a slot $l$ in the bar. The upper disk $b$ is pressed down towards the rings $e$ and plates $f$ by a helical spring $k$ resting upon a tube $m$ that surrounds the bar $c$ and extends up from the upper disk $b$, the upper end of the spring being acted upon by a hand wheel nut $n$ fitting a threaded part of the bar $c$. Above the hand wheel nut $n$ there is fixed to the bar $c$ a second hand wheel $o$ by means of which the bar $c$ and the parts carried thereby can be turned.

When the rings $e$ and plates $f$ are put together between the disks $a$ and $b$ as described, the lower hand wheel $n$ is turned in relation to the other $o$, till a gentle pressure is given to the stack of rings $e$ and plates $f$. The whole is now heated to about three hundred degrees Fahrenheit so as to cause the paste between the rings $e$ and the plates $f$ to set. The spring $k$ is now fully compressed, whereupon the guide rods $i$ may be withdrawn. The bar $c$, which is suspended from a chain $p$ carried over a pulley $q$ provided with a balance weight $r$, is now lowered so as to introduce the stack of plates and rings into a firebrick chimney or vertical cylindrical furnace $s$ (Fig. 2). This chimney or furnace has a lateral opening $t$ through which a clear non-oxidizing flame is directed upon the plates $f$ and rings $e$—for example, from a vapor burner comprising a casing $u$ from which the flame issues and a pipe $v$ in which petrol is vaporized by an auxiliary burner $w$ and from which jets of the vapor issue opposite Bunsen apertures $x$ in the casing $u$. The bar is now turned slowly and moved slightly up and down as much as required to insure the even heating of the stack. At a dull red heat gases are evolved from the jointing material some of which, while it was pasty, will have been squeezed into the interior of the tube formed by the rings and plates, and there is produced within the tube a gaseous pressure which by blowing through the joints cleans the jointing surfaces, any excess of gas escaping through a tube $y$ extending upwardly from the upper disk $b$ and provided at its upper end with a safety valve $z$. At or slightly above a cherry-red heat, to which the tube is raised after sufficient time has been given at or about the softening point of the alloy to allow of the cleansing of the joints and the escape of the gases therefrom, the jointing is complete, and until this is effected the pressure is maintained or even increased by turning the two hand wheels n and o in relation to each other; the heating of the tube from the temperature at which the paste sets may advantageously be effected by passing an electric current through the stack of rings and plates, as the metallic particles of the jointing material form a conducting path of very high resistance and almost immediately reach a very high temperature—to employ electricity the disk b should be provided with one terminal and be insulated from the bar c, which should not touch the plates, and the disk a should be provided with the other terminal, the asbestos washers g and h being omitted: The employment of electricity is illustrated by Fig. 3, in which the disk b is shown as separated by insulating material 1 from a collar 2 in which the removable key j fits, 3 and 4 indicate collecting rings secured to the disks a and b respectively, and 5 represents a source of electricity connected as shown by brushes to the collecting rings 3 and 4.

The details may obviously be varied. Where the surfaces are very wide the quantity of flux inside the tube must be increased or other means used for increasing the pressure in the tube.

In some cases gaseous pressure exerted outside the tubes instead of inside may be employed for cleaning the jointing surfaces—for example, a vacuum may be formed in the tube to utilize the pressure of the atmosphere for the purpose.

To enable a vacuum to be produced in the tube or the pressure in the tube to be increased as above indicated, the bar c may be made hollow and its interior made to communicate with the interior of the tube and its upper end connected to a suction or a force pump as the case may be. This modification is illustrated by Fig. 4, in which 6 indicates a passage formed in the bar c and communicating by a port 6° with the interior of the pile of rings and plates, and 7 a junction piece secured to the bar c and connected by a pipe represented at 8 to a pump indicated at 9.

The jointing metal or alloy may be in the form of a ring which may be of a diamond section as shown at 1 in Fig. 5 so that it will embed itself into the flux (with which alone the rings and the plates will be coated) and upon melting will be forced across the surfaces as an extending film and so caused to cleanse them.

To obtain a joint capable of withstanding great heat or pressure I use a metal or alloy capable of readily alloying with the material or materials of one or both of the surfaces to be united. For example, for producing tubes composed of brass rings and brass plates and capable of withstanding extremely high internal pressure—for example, a pressure of 200 or 250 lbs. per sq. in.—I prefer to employ, instead of the alloy and the flux hereinbefore described, an alloy consisting of 10 (ten) parts by weight of zinc, 60 (sixty) parts by weight of brass, and 30 (thirty) parts by weight of tin, and a flux consisting of 3 (three) parts by weight of borax, which, after reducing the alloy to a fine powder, I add thereto with the necessary water to produce a paste. When using this jointing material I heat the components of the tube up to a final temperature of just under white heat; special care must in this case be taken to insure the uniform heating of the tube and for that purpose the opening at the upper end of the chimney or furnace is reduced as much as practicable by a non-conducting cover 11 (Fig. 6), which is made with a central aperture 12 only slightly larger in diameter than the tube m so as to provide a small outlet for the products of combustion, or electric heating, which is preferable on account of its automatic localization of the highest temperature to the joints themselves, is resorted to. Again, when joining together steel or iron plates and rings the metallic portion of the jointing material may advantageously be either steel of a low welding temperature or wrought iron, the flux being either borax or boracic acid; electric heating should in this case be employed.

What I claim is:—

1. In the manufacture of a tube built up of rings, or of rings and perforated plates, the method of producing the joints between the several rings, or rings and plates, which consists in pressing them together with interposition of jointing material comprising metallic material and flux and adapted to keep the joints open until their surfaces are cleaned by the hereinafter referred to expulsion of oxid or other foreign matter therefrom; heating the rings or rings and plates to above the setting point of said jointing material and expelling the oxid or other foreign matter from the joints while the component parts of the tube are still pressed together; and finally heating the tube with said parts sufficiently pressed together until proper jointing is effected, substantially as described.

2. In the manufacture of a tube built up of rings, or of rings and perforated plates, the method of producing the joints between the several rings, or rings and plates, which consists in pressing them together with interposition of jointing material comprising metallic material and flux and adapted to keep the joints open until their surfaces are cleaned by the hereinafter referred to expulsion of oxid or other foreign matter therefrom; heating the rings or rings and plates to above the setting point of said jointing material and expelling the oxid or other foreign matter from the joints by blowing it through the joints while the component parts of the tube are still pressed together; and finally heating the tube with said parts sufficiently pressed together until proper jointing is effected, substantially as described.

3. In the manufacture of a tube built up of rings, or of rings and perforated plates, the method of producing the joints between the several rings, or rings and plates, which consists in pressing them together with interposition of jointing material comprising metallic material and flux and adapted to keep the joints open until their surfaces are cleaned by the hereinafter referred to expulsion of oxid or other foreign matter therefrom; heating the rings or rings and plates to above the setting point of said jointing material and expelling the oxid or other foreign matter from the joints by subjecting the tube to internal gaseous pressure while the component parts of the tube are still pressed together; and finally heating the tube with said parts sufficiently pressed together until proper jointing is effected, substantially as described.

4. In the manufacture of a tube built up of rings, or of rings and perforated plates, the method of producing the joints between the several rings, or rings and plates, which consists in pressing them together with interposition of jointing material comprising metallic material and flux and adapted to keep the joints open until their surfaces are cleaned by the hereinafter referred to expulsion of oxid or other foreign matter therefrom; heating the rings or rings and plates to above the setting point of said jointing material and expelling the oxid or other foreign matter from the joints by subjecting the tube to internal pressure produced by gas generated by the heating of the jointing material while the component parts of the tube are still pressed together; and finally heating the tube with said parts sufficiently pressed together until proper jointing is effected, substantially as described.

5. In the manufacture of a tube built up of rings or of rings and perforated plates, the method of producing the joints between the several rings or rings and plates which consists in coating the surfaces to be jointed with flux, pressing them together with an interposed strip of jointing metallic material, heating the rings or rings and plates to above the setting point of the flux and expelling the oxid or other foreign matter from the joints while the component parts of the tube are still pressed together, and finally heating the tube with said parts sufficiently pressed together until proper jointing is effected.

6. The method of making a tube which consists in forming a stack of rings and plates with jointing material interposed between adjacent rings and plates, pressing said rings and plates together elastically by means of end disks while said plates are held in proper position in relation to said rings by means of rods extending from one of said disks through holes in said plates and into the other of said disks and engaging said rings, heating said stack to above the setting point of said jointing material and expelling the oxid or other foreign matter from the joints while the component parts of said stack are still pressed together, and finally heating said stack with said parts sufficiently pressed together until proper jointing is effected, substantially as described.

7. In the manufacture of a tube built up of rings, or of rings and perforated plates, the method of producing the joints between the several rings, or rings and plates, which consists in pressing them together with interposition of jointing material comprising metallic material and flux, heating the rings or rings and plates by heat produced by combustion, and afterwards passing an electric current of sufficient strength through the juxtaposed rings or rings and plates and across the jointing material between them to effect the proper jointing of the said juxtaposed parts.

Signed at London England this 16" day of December 1905.

WILLIAM JOSEPH STILL.

Witnesses:
H. D. JAMESON,
A. NUTTING.